United States Patent [19]

Clark et al.

[11] 3,957,714

[45] May 18, 1976

[54] METHOD FOR MAKING PAINTABLE SILICONE SURFACES AND ELASTOMER

[75] Inventors: William H. Clark; Robert D. Johnson, both of Midland, Mich.

[73] Assignee: Dow Corning Corporation, Midland, Mich.

[22] Filed: May 19, 1975

[21] Appl. No.: 578,708

[52] U.S. Cl. .................... 260/33.6 SB; 260/31.2 R; 260/32.8 SB; 260/33.2 SB; 260/33.8 SB
[51] Int. Cl.$^2$ .......................................... C08K 5/01
[58] Field of Search ................. 260/37 SB, 33.6 SB, 260/32.8 SB, 33.2 SB, 33.8 SB

[56] References Cited
UNITED STATES PATENTS 3,836,503   9/1974   Schulz ............................ 260/37 SB

*Primary Examiner*—Lewis T. Jacobs
*Attorney, Agent, or Firm*—Roger H. Borrousch

[57] ABSTRACT

Mixing under substantially anhydrous conditions, below 60°C. and under shear conditions which do not substantially alter filler structure, 100 parts by weight of a hydroxyl endblocked polydimethylsiloxane, 70 to 150 parts by weight of a finely divided agglomerated precipitated acicular calcium carbonate, 35 to 200 parts by weight of organic solvent, from 12 to 20 parts by weight of monoalkyltriacetoxysilane and a catalytic amount of an organotin carboxylate, a curable mixture which is storable under anhydrous conditions is obtained. Exposing this curable mixture to atmospheric moisture and allowing the organic solvent to evaporate provides a cured coherent solid elastomeric material which is paintable with at least one type of decorative organic base paint which forms a continuous coating over the surface and adheres thereto. Silicone rubber compositions are also described which cured to elastomers having paintable surfaces.

10 Claims, No Drawings

METHOD FOR MAKING PAINTABLE SILICONE SURFACES AND ELASTOMER

BACKGROUND OF THE INVENTION

1. Field of the Invention

This invention relates to a method of preparing a silicone elastomer with a paintable surface.

2. Description of the Prior Art

Silicone elastomeric compositions which cure through the reactivity of the acetoxysilicon functionality have been known for some time as illustrated by Bruner in U.S. Pat. No. 3,035,016 and Dupree in U.S. Pat. No. 3,274,145.

Bruner describes acyloxy siloxanes, moisture curing compositions and their preparation. Bruner describes using inert organic solvents to prepare his siloxanes including hydrocarbons such as benzene, toluene, xylene or petroleum ethers; halogenated solvents such as perchloroethylene or chlorobenzene and organic ethers such as diethylether and dibutylether, ketones such as methylisobutylketone and fluid hydroxyl-free siloxanes. Bruner states that the compositions may be kept in the solvent until it is used, particularly when a gummy product is to be employed in coating applications. Bruner also suggests using well-known reinforcing fillers such as fume silicas, silica aerogels, and precipitated silicas; non-reinforcing fillers such as coarse silicas like diatomaceous earth, crushed quartz or metallic oxides such as titania, ferric oxide and zinc oxide and fibrous fillers such as asbestos or glass. Bruner in U.S. Pat. No. 3,077,465 also teaches the use of carboxylic acid salts of metals including the tin salts for improving the curing of the compositions at room temperature.

Dupree describes acyloxy siloxane compositions prepared using siloxane polymers which are partially endblocked with triorganosiloxy units, the remaining endblockers being hydroxyl radicals. Dupree describes the use of fillers such as powdered metals such as aluminum, tin and zinc; powdered silicon, silica, mica, clay and metal oxides such as iron oxide.

Shaw in U.S. Pat. No. 3,701,753 describes organic solvent solutions of a silicone rubber composition containing a silanol-terminated diorganopolysiloxane base polymer with a viscosity of 1,000 to 100,000 centipoise at 25°C. and an organotriacyloxysilane. Shaw teaches that only a few organic solvents have been found suitable which include ethylacetate, pentane, hexane, heptane, mineral spirits, naphtha, xylene, toluene and cyclohexane where cyclohexane is the preferred solvent. Shaw, however, states that ethylacetate, xylene, toluene, normal alcohols, ketones and chlorinated hydrocarbons are unsuitable because they are too hydroscopic to provide shelf stable compositions.

Shaw also describes the use of from 10 to 200 parts filler per 100 parts of the organopolysiloxane polymer. The fillers described are titanium dioxide, lithopone, zinc oxide, zirconium silicate, silica aerogel, iron oxide, diatomaceous earth, calcium carbonate, fume silica, precipitated silica, glass fibers, magnesium oxide, chromic oxide, zirconium oxide, aluminum oxide, crushed quartz, calcined clay, asbestos, carbon, graphite, cork, cotton and synthetic fibers.

In U.S. Pat. No. 3,817,894, Butler et al. describe a commercial silicone rubber bathtub caulk based on an acetoxyfunctional silicone polymer and show the cured product has poor paintability properties with both latex and oil base paint.

From the prior art, it is thus known to prepare acyloxy containing silicone compositions in organic solvent and to use fillers, but it is unexpected that a paintable surface can be obtained from a cured acetoxy containing composition.

SUMMARY OF THE INVENTION

It is an object of this invention to prepare a cured silicone elastomer with a paintable surface and to provide silicone elastomer compositions which cure to provide paintable surfaces.

This invention relates to a method of forming a paintable silicone rubber surface by mixing under substantially anhydrous conditions below 60°C. and under shear conditions which do not substantially alter the filler structure, a hydroxyl endblocked polydimethylsiloxane, a finely divided, agglomerated precipitated acicular calcium carbonate, organic solvent, monoalkyltriacetoxysilane and a tin catalyst. The resulting mixture is cured by exposing it to atmospheric conditions where the solvent evaporates to provide a cured solid elastomeric surface which is paintable with at least one type of decorative organic base paint. This invention also relates to silicone rubber compositions which cure to solid elastomers which have a paintable surface.

DESCRIPTION OF THE INVENTION

This invention relates to a method of forming a paintable silicone rubber surface comprising (I) mixing under substantially anhydrous conditions below a temperature of about 60°C. and under shear conditions which do not substantially alter filler structure, (A) 100 parts by weight of a hydroxyl endblocked polydimethylsiloxane having a viscosity of from 2500 cps. at 25°C. up to and including non-flowable gums having from 0 to 40 percent inclusive of the total end groups as trimethylsiloxy units (B) from 70 to 150 parts by weight of a finely divided, agglomerated precipitated acicular calcium carbonate, (C) from 35 to 200 parts by weight of an organic solvent selected from the group consisting of aliphatic hydrocarbons, chlorinated aliphatic hydrocarbons, ketones, aromatics, esters, ethers and mixtures thereof, said organic solvent being a solvent for the silicon-containing species defined herein and having an evaporation rate such that said organic solvent is substantially evaporated within a 48 hour period, (D) from 12 to 20 parts by weight of a monoalkyltriacetoxysilane where the alkyl radical has from 1 to 4 carbon atoms per radical and (E) a catalytic amount of an organotin carboxylate, obtaining a curable mixture storable under anhydrous conditions, (II) exposing said curable mixture to atmospheric conditions, (III) allowing the organic solvent to evaporate, after the organic solvent has evaporated and the curable mixture has cured to coherent solid elastomeric material, any exposed surface of said coherent solid elastomeric material is paintable with at least one type of decorative organic base paint which forms a continuous coating over the surface of said coherent solid elastomeric material and said continuous coating adheres to the surface of said coherent solid elastomeric material.

To make a silicone elastomer with a paintable surface, the compositions are prepared in a certain way. It has been found that certain ingredients if mixed together under substantially anhydrous conditions at a temperature below about 60°C. will form a composition which cures to provide an elastomeric surface which can be painted. The mixing operation must be done under conditions where the shear does not substantially alter the filler structure. Filler structure, for the purposes of this invention, is defined as the agglomeration of filler particles into irregular three dimensional networks which contains voids. The small filler particles bond together to form larger particles of a three dimensional network but are still finely divided particles. It is this structure of the filler which must not be altered to any substantial degree such that the three dimensional structure is broken down. It is to be understood that almost any mixing will produce some minor change in the filler structure, but, for the purposes of this invention, the changes which occur are undetectable for all practical purposes.

The wide variety of mixing equipment which is available today and the difficulty in defining the shear for each piece of equipment and each composition allows only a general consideration. High shear equipment should not be used in that the filler structure will be broken down and thus the resulting composition will not cure to an elastomer with a paintable surface. Low shear dough type mixers are considered suitable. The mixing should preferably be done by gently dispersing the hydroxyl endblocked polymer and the calcium carbonate filler in the solvent. The monoalkyltriacetoxysilane and organotin carboxylate are then added and mixed into the polymer-filler-solvent mixture.

After the mixture is formed it can be put into containers for storage under substantially anhydrous conditions or used immediately. This mixture is curable upon exposure to atmospheric conditions, so that by depositing this curable composition in ambient atmosphere the organic solvent evaporates and the composition cures to a coherent solid elastomeric material. Any exposed surface of this elastomeric material is paintable with at least one type of decorative organic base paint. For the purposes of this invention, paintable means that a continuous coating can be applied to the surface of the cured elastomeric material without fish eyeing, for example, and that the coating will adhere to this surface. An adherance test can be used to illustrate the adhesiveness of the paint to the surface of the cured elastomeric material. One such test is known as the Boeing No. 250 Tape Test which is defined in the examples in a modified form and is basically cutting a one inch square of painted surface into 100 equal squares, applying a tape over these squares and pulling the tape off and counting the number of squares which remain adhered to the elastomeric surface. From this test, a percentage of paint retention can be determined. A percentage of 60 percent retention or above is considered to be excellent paint adhesion to the elastomeric material surface.

By the phrase, "at least one type of decorative organic base paint," it is to be understood that the cured compositions of this invention will be paintable by at least one paint which is organic in nature such as those sold commercially as latex paints and oil based paints. By organic base, the carrier for the paint is not being considered, thus the carrier may be water or organic solvent. The cured compositions are preferably paintable with a broad spectrum of different paints, but some compositions may be more selective as to the type of paint when adhesion is considered, however, the cured composition can be painted by any paint but some may adhere better than others according to the paint adhesion test defined herein.

The hydroxyl endblocked polydimethylsiloxane (A) can be any viscosity polymer from 2500 centipoise (cps.) at 25°C. up to and including the non-flowable benzene soluble gums. Below a viscosity of 2500 cps. a hydroxyl endblocked polydimethylsiloxane does not provide a paintable cured composition. Preferably, the viscosity of the polydimethylsiloxane is from 5,000 to 30,000 cps. at 25°C. Combinations of two or more polydimethylsiloxanes of different viscosities have been found useful, such as mixtures of fluid polydimethylsiloxanes of 10,000 to 15,000 cps. with benzene soluble polydimethylsiloxane gums. Additionally, the hydroxyl endblocked polydimethylsiloxane can also be partially endblocked with trimethylsiloxy units in amounts such that there is up to 40 percent of the endgroups as trimethylsiloxy units. These trimethylsiloxy units endblock some polydimethylsiloxane molecules on one end and there is hydroxyl endblocking on the other end. These polymers are known from the Dupree patent described above which is hereby incorporated by reference to show these polydimethylsiloxanes partially endblocked with trimethylsiloxy units. Mixtures of polydimethylsiloxane gum and polydimethylsiloxane fluids partially endblocked with trimethylsiloxy units are particularly useful in this invention.

A calcium carbonate filler, (B), is present in amounts of from 70 to 150 parts by weight based on 100 parts by weight of the hydroxyl endblocked polydimethylsiloxane. The calcium carbonate which provides a paintable surface on the cured composition are those which are finely divided precipitated acicular calcium carbonates which are agglomerated to form structured particles. These calcium carbonates are available commercially, such as Albacar 5970, 5960 and 5950 from C. K. Williams and Co., 640 N. 13th St., Easton, Pa. However, the defined calcium carbonates only provide excellent paintable surfaces in the defined compositions if their structure is not substantially altered during the preparation of the composition. Mixing the ingredients used to form the compositions decreases the paintability directly in proportion to the amount of structure alteration. The calcium carbonate is preferably present in amounts of from 100 to 130 parts by weight.

The organic solvent, (C), can be present in amounts of from 35 to 200 parts by weight per 100 parts by weight of (A). The organic solvents of this invention are solvents for the silicon-containing species defined herein, including (A) and (D). The organic solvents also have an evaporation rate at ambient temperatures such that the organic solvent is substantially evaporated within a 48 hour period from the composition. These organic solvents include aliphatic hydrocarbons such as pentane, hexane, heptane, octane, mineral spirits and naphthas; chlorinated aliphatic hydrocarbons such as carbon tetrachloride, 1,1,1-trichloroethane, trichloroethylene, perchloroethylene, propylene dichloride and methylene chloride; ketones such as acetone, methylethyl ketone, methylacetone, cyclohexanone, methyl isobutyl ketone and diacetone; aromatics such as benzene, toluene, xylene aromatic naphthas; esters such as ethyl acetate, isopropyl acetate, normal propyl acetate, secondary butyl acetate, normal butyl acetate and amyl acetate; ethers such as diethylether, dichloroethyl ether, and isopropyl ether. The organic solvents are preferably present in amounts of from 50 to 80 parts by weight per 100 parts by weight of (A)

where the compositions are particularly suitable as caulking materials.

The monoalkyltriacetoxysilane, (D), can be methyltriacetoxysilane, ethyltriacetoxysilane, propyltriacetoxysilane, butyltriacetoxysilane or mixtures of these silanes. The silane, (D), can be present in amounts of from 12 to 20 parts by weight per 100 parts by weight of (A). Amounts of (D) above 20 parts by weight decreases the physical properties of the cure composition to undesirable levels and amounts of (D) below 12 parts by weight decreases the storage stability of the composition to undesirable levels.

The organotin carboxylate catalysts of (E) can be any of the well-known tin catalyst such as dibutyltindiacetate, dibutyltindilaurate and dibutyltindi-2-ethylhexoate. The catalyst, (E), can be present in catalytic amounts, preferably from 0.01 to 1 parts by weight per 100 parts by weight of (A).

Other ingredients can be present such as pigments and colorants, antioxidants, flame retardant additives and the like. However, additional ingredients should be checked as to the effect on paintability before use.

The method of this invention is useful for making surfaces of cured elastomeric material which are paintable. Although many ingredients similar to these ingredients have been mixed in the past, the ingredients of this invention have not previously been put together in the amounts and manner as defined herein such that when cured the surfaces are paintable by many types of paints. The compositions can be stored in the absence of moisture for extended periods of time, such as greater than 6 months and can be cured by exposing them to moisture, such as atmospheric moisture. These compositions which have the calcium carbonate filler structure substantially unchanged can be used as caulking materials which are paintable and the compositions which contain the larger concentrations of organic solvent are useful as coating materials which can be painted.

The following examples are presented for illustrative purposes only and should not be construed as limiting the present invention which is properly delineated in the claims. In the following examples all parts by weight and the viscosities are at 25°C.

EXAMPLE 1

Compositions were prepared by mixing 110 parts of a filler defined in Table I, 50 parts of a hydroxyl endblocked polydimethylsiloxane fluid having a viscosity of about 12,500 cps. and having 14 percent of the endgroups as trimethylsiloxy units and 86 percent as hydroxyl radicals and 57.5 parts of mineral spirits. These ingredients were mixed with sufficient action to form a homogeneous mixture while keeping the shearing to a minimum so as to not alter the filler structure. The mixing throughout was done in this manner. After the above ingredients were homogeneous, small portions of a hydroxyl endblocked polydimethylsiloxane gum having a Williams plasticity in the range of 0.055 to 0.059 inch containing about 1 weight percent fume silica was added and mixed until 50 parts were added to the mixture. A paste of 15 parts of a mixture having equal parts of methyltriacetoxysilane and ethyltriacetoxysilane, 0.075 parts of dibutyltindiacetate and 15 parts of filler was then added to the mixture and the mixing continued until a homogeneous mixture was obtained.

Samples of each mixture were cured for seven days and the durometer on the Shore A scale, the tensile strength and elongation were determined. The tensile strength and elongation were determined by the procedure described in ASTM-D-412. The test used for paint retention was a modification of the Boeing No. 250 Tape Test. Each composition was spread on a plywood board at a thickness of one-sixteenth to one-eighth inch and then allowed to cure under ambient conditions which varied depending on the relative humidity. Equivalent cures were obtained at one day with a 45 percent relative humidity and 3 days with a 35 percent relative humidity. After curing, about one half of the cured composition was painted with an oil base paint (Sherwin-Williams Kem Glo) and the other half was painted with a latex paint (DuPont Lucite House Paint). The paint retention was then tested after 3 and 14 days by dividing a one inch square of painted surface into 100 equal squares using a razor blade to cut the painted surface which had a grid pattern marked on the surface. Scotch Brand No. 610 tape was firmly pressed over the cut grid. The tape was then removed by slowly pulling at about 30° angle. The percent paint retention was the number of paint squares remaining on the cured composition after removal of the tape. The results of the physical properties and the paint retention test were as shown in Table I.

Table I

| Reference No. | Filler | Physical Properties | | | Paint Retention, after | | |
|---|---|---|---|---|---|---|---|
| | | Durometer, Shore A | Tensile, p.s.i. | Elongation, % | Type Paint | 3 days | 14 days |
| 1. | Calcium Carbonate, precipitated agglomerated acicular, Product A | 75 | 179 | 208 | Oil Base<br>Latex | 100<br>78 | 100<br>98 |
| 2. | Calcium Carbonate, precipitated agglomerated acicular, Product B | 70 | 162 | 167 | Oil Base<br>Latex | 0<br>86 | 93<br>93 |
| 3. | Calcium Carbonate, precipitated agglomerated acicular, Product C | 65 | 198 | 233 | Oil Base<br>Latex | 30<br>0 | 75<br>67 |
| 4. | Calcium Carbonate, precipitated, spherical | — | — | — | Oil Base<br>Latex | 0<br>0 | 2<br>6 |
| 5. | Calcium Carbonate, ground, Product D | 30 | 59 | 83 | Oil Base<br>Latex | 0<br>0 | 0<br>0 |
| 6. | Calcium Carbonate, ground, Product E | 30 | 60 | 75 | Oil Base<br>Latex | 0<br>0 | 0<br>0 |

Table I-continued

| Reference No. | Filler | Physical Properties Durometer, Shore A | Tensile, p.s.i. | Elongation, % | Type Paint | Paint Retention, after 3 days | 14 days |
|---|---|---|---|---|---|---|---|
| 7. | Calcium Carbonate, ground, Product F | 28 | 59 | 100 | Oil Base<br>Latex | 0<br>0 | 0<br>0 |
| 8. | Ground quartz, 5 micron | 36 | 315 | 177 | Oil Base<br>Latex | 0<br>0 | 0<br>0 |
| 9. | Talc | 53 | 397 | 120 | Oil Base<br>Latex | 0<br>0 | 3<br>0 |
| 10. | Silica, micronized amphorous, Product G | 43 | 267 | 153 | Oil Base<br>Latex | 0<br>0 | 0<br>0 |
| 11. | Silica, micronized amphorous, Product H | 41 | 330 | 210 | Oil Base<br>Latex | 0<br>0 | 0<br>0 |

EXAMPLE 2

Compositions were prepared as described in Example 1 except the ingredients were 75 parts of the polydimethylsiloxane fluid as described in Example 1, 25 parts of a hydroxyl endblocked polydimethylsiloxane gum having a Williams plasticity between 0.055 and 0.059 inch containing about 1 weight percent fume silica, 125 parts of calcium carbonate, Product A as defined in Example 1, X parts of mineral spirits, 15 parts of the mixture of silanes and 1 part of a mixture of equal parts of dibutyltindi-2-ethylhexoate and xylene. In this example, the calcium carbonate and mineral spirits were mixed and small portions of gum were added as described in Example 1. The amount of mineral spirits in each composition was as defined in Table II. The physical properties and paint retention were obtained as described in Example 1 and were as shown in Table II.

16.5 parts of the mixture of silanes as defined in Example 1, and
0.0825 parts of dibutyltindiacetate.

B.

55 parts of mineral spirits,
118 parts of calcium carbonate, Product A as defined in Example 1,
65 parts of the polydimethylsiloxane fluid as defined in Example 1,
35 parts of the polydimethylsiloxane gum as defined in Example 1,
14 parts of the mixture of silanes as defined in Example 1, and
0.07 parts of dibutyltindiacetate.

C.

Table II

| Reference No. | X, parts | Physical Properties Durometer, Shore A | Tensile, p.s.i. | Elongation, % | Type Paint | Paint Retention, after 3 days | 14 days |
|---|---|---|---|---|---|---|---|
| 1. | 70 | 64 | 180 | 180 | Oil Base<br>Latex | 100<br>96 | 100<br>89 |
| 2. | 57.5 | 72 | 190 | 170 | Oil Base<br>Latex | 100<br>99 | 100<br>99 |
| 3. | 55 | 69 | 190 | 182 | Oil Base<br>Latex | 100<br>99 | 100<br>84 |
| 4. | 50 | 57 | 223 | 205 | Oil Base<br>Latex | 100<br>97 | 100<br>100 |
| 5. | 45 | 55 | 180 | 142 | Oil Base<br>Latex | 63<br>21 | 100<br>64 |
| 6. | 35 | 58 | 230 | 165 | Oil Base<br>Latex | 26<br>65 | 98<br>2 |

EXAMPLE 3

The following compositions were prepared as described in Example 1 and the results were as described in Table III.

A.

55 parts of mineral spirits,
110 parts of calcium carbonate, Product A as defined in Example 1,
65 parts of the polydimethylsiloxane fluid as defined in Example 1,
35 parts of the polydimethylsiloxane gum as defined in Example 1, 215 parts of mineral spirits,
115 parts of calcium carbonate, Product A as defined in Example 1,
50 parts of a hydroxl endblocked polydimethylsiloxane fluid having a viscosity of about 12,500 cps.,
50 parts of a hydroxyl endblocked polydimethylsiloxane gum having a Williams plasticity between 0.055 and 0.059 inch,
15 parts of the mixture of silanes as defined in Example 1, and
0.075 part of dibutyltindiacetate.

D.

57.5 parts of mineral spirits, 75 parts of calcium carbonate, Product A as defined in Example 1,
25 parts of ground calcium carbonate,
75 parts of the polydimethylsiloxane fluid as defined in Example 1,
25 parts of polydimethylsiloxane gum as defined in C. above,
15 parts of the mixture of silanes as defined in Example 1, and
0.075 parts of dibutyltindiacetate.

E.

A composition as defined in D, above except there is 100 parts of calcium carbonate, Product A, present and the 25 parts of ground calcium carbonate was replaced with 12.5 parts of diatomaceous earth and 12.5 parts of 5 micron crushed quartz.

F.

A composition as defined in D. above except there is 125 parts of calcium carbonate, Product A, present and no other fillers.

G.

57.5 parts of mineral spirits,
125 parts of calcium carbonate, Product C as defined in Example 1,
75 parts of hydroxyl endblocked polydimethylsiloxane fluid having a viscosity of about 12,500 cps.,
25 parts of the polydimethylsiloxane gum defined in C. above,
15 parts of the mixture of silanes as defined in Example 1, and
0.075 part dibutyltindiacetate.

H.

A composition as defined in G. above except 125 parts of calcium carbonate, Product A was used.

I.

A composition as defined in H. above, except the polydimethylsiloxane fluid has a viscosity of about 3000 cps.

J.

A composition as defined in H. above, except the polydimethylsiloxane fluid had a viscosity of about 2,000 cps. This composition is presented for comparative purposes.

K.

57.5 parts of mineral spirits,
115 parts of calcium carbonate, Product A,
100 parts of polydimethylsiloxane fluid as defined in Example 1,
15 parts of the mixture of silanes as defined in Example 1, and
0.075 part dibutyltindiacetate.

L.

55 parts of xylene,
110 parts of calcium carbonate, Product A,
65 parts of the polydimethylsiloxane fluid as defined in Example 1,
35 parts of the polydimethylsiloxane gum as defined in Example 1,
15 parts of the mixture of silanes as defined in Example 1, and
0.075 part dibutyltindiacetate.

M.

A composition as defined in L. above except 1,1,1-trichlorothane was used in place of xylene.

N.

40 parts of mineral spirits,
125 parts of calcium carbonate, Product A,
80 parts of the polydimethylsiloxane fluid as defined in Example 1,
20 parts of the polydimethylsiloxane gum as defined in C. above
15 parts of the mixture of silanes as defined in Example 1, and
0.075 part dibutyltindiacetate.

O.

57.5 parts of mineral spirits,
62.5 parts of 5 micron crushed quartz,
62.5 parts of diatomaceous earth,
75 parts of the polydimethylsiloxane fluid as defined in Example 1,
25 parts of the polydimethylsiloxane gum as defined in Example 1,
15 parts of the mixture of silanes as defined in Example 1 and
0.075 part dibutyltindiacetate.

This composition is presented for comparative purposes.

Table III

| Composition | Type Paint | Paint Retention, after 3 days | 14 days |
|---|---|---|---|
| A. | Oil Base | 100 | — |
| B. | Oil Base | 100 | — |
| C. | Oil Base | 100 | — |
| D. | Oil Base | 21 | 83 |
|    | Latex | 67 | 17 |
| E. | Oil Base | 91 | — |
|    | Latex | 59 | — |
| F. | Oil Base | 63 | 100 |
|    | Latex | 21 | 64 |
| G. | Oil Base | 35 | 83 |
|    | Latex | 1 | 2 |
| H. | Oil Base | 1 | 90 |
|    | Latex | 0 | 12 |
| I. | Oil Base | 65* | — |
|    | Latex | 4* | — |
| J. | Oil Base | 0 | 0 |
|    | Latex | 0 | 0 |
| K. | Oil Base | 100 | — |
|    | Latex | 100 | — |

Table III-continued

| Composition | Type Paint | Paint Retention, after 3 days | 14 days |
|---|---|---|---|
| L. | Oil Base | 64* | — |
| | Latex | 97* | — |
| M. | Oil Base | 4* | — |
| | Latex | 84* | — |
| N. | Oil Base | — | 88 |
| O. | Oil Base | 0 | 0 |
| | Latex | 0 | 0 |

*After 7 days.

That which is claimed is:

1. A method of forming a paintable silicone rubber surface comprising
   I. mixing under substantially anhydrous conditions below a temperature of about 60°C. and under shear conditions which do not substantially alter filler structure,
      A. 100 parts by weight of a hydroxyl endblocked polydimethylsiloxane having a viscosity of from 2500 cps. at 25°C. up to and including non-flowable gums having from 0 to 40 percent inclusive of the total end groups as trimethylsiloxy units,
      B. from 70 to 150 parts by weight of a finely divided, agglomerated precipitated acicular calcium carbonate,
      C. from 35 to 200 parts by weight of a organic solvent selected from the group consisting of aliphatic hydrocarbons, chlorinated aliphatic hydrocarbons, ketones, aromatics, esters, ethers and mixitures thereof, said organic solvent being a solvent for the silicon-containing species defined herein and having an evaporation rate such that said organic solvent is substantially evaporated within a 48 hour period,
      D. from 12 to 20 parts by weight of a monoalkyltriacetoxysilane where the alkyl radical has from 1 to 4 carbon atoms per radical and
      E. a catalytic amount of an organotin carboxylate, obtaining a curable mixture storable under anhydrous conditions,
   II. exposing said curable mixture to atmospheric conditions,
   III. allowing the organic solvent to evaporate, after the organic solvent has evaporated and the curable mixture has cured to coherent solid elastomeric material, any exposed surface of said coherent solid elastomeric material is paintable with at least one type of decorative organic base paint which forms a continuous coating over the surface of said coherent solid elastomeric material and said continuous coating adheres to the surface of said coherent solid elastomeric material.

2. The method in accordance with claim 1 in which the hydroxyl endblocked polydimethylsiloxane of (A) is a mixture of a gum and a polydimethylsiloxane having a viscosity of from 5,000 to 30,000 cps. at 25°C. and having from 10 to 30 percent of the total endgroups as trimethylsiloxy units, said trimethylsiloxy units being present substantially as terminal units of polydimethylsiloxane species in which one end is trimethylsiloxy and the other is hydroxyl, the monoalkyltriaceoxysilane is a mixture of monomethyltriacetoxysilane and monoethyltriacetoxysilane and the organotin carboxylate is dibutyltin diacetate.

3. The method in accordance with claim 2 wherein the organic solvent is present in an amount of from 50 to 80 parts by weight.

4. The method in accordance with claim 2 in which the organic solvent is mineral spirits.

5. The method in accordance with claim 4 wherein the mineral spirits are present in a amount of from 50 to 80 parts by weight.

6. A silicone rubber composition which is stable under anhydrous conditions, but curable upon exposure to atmospheric conditions and where surfaces of cured coherent solid elastomeric material is paintable with at least one type of decorative paint which forms a continuus coating over the surface of said coherent solid elastomeric material and said continuous coating adheres to the surface of said coherent solid elastomeric material, consisting essentially of
   A. 100 parts by weight of a hydroxyl endblocked polydimethylsiloxane having a viscosity of from 2500 cps. at 25°C. up to and including non-flowable gums having from 0 to 40 percent inclusive of the total end groups as trimethylsiloxy units,
   B. from 70 to 150 parts by weight of a finely divided, agglomerated precipitated acicular calcium carbonate,
   C. from 35 to 200 parts by weight of an organic solvent selected from the group consisting of aliphatic hydrocarbons, chlorinated aliphatic hydrocarbons, ketones, aromatics, esters and ethers, said organic solvent being a solvent for the silicon containing species defined herein and having an evaporation rate such that said organic solvent is substantially evaporated within a 48 hour period from said silicone rubber composition,
   D. from 12 to 20 parts by weight of a monoalkyltriacetoxysilane where the alkyl radical has from 1 to 4 carbon atoms per radical, and
   E. a catalytic amount of an organotin carboxylate.

7. The silicone rubber composition of claim 6 wherein the hydroxyl endblocked polydimethylsiloxane of (A) is a mixture of a gum and a polydimethylsiloxane having a viscosity of from 5000 to 30,000 cps. at 25°C., the monoalkyltriacetoxysilane is a mixture of monoethyltriacetoxysilane and monomethyltriacetoxysilane and the organotin carboxylate is dibutyltindiacetate.

8. The silicone rubber composition of claim 7 wherein the organic solvent is present in an amount of from 50 to 80 parts by weight.

9. The silicone rubber composition of claim 7 in which the organic solvent is mineral spirits.

10. The silicone rubber composition of claim 9 in which the mineral spirits is present in an amount of from 50 to 80 parts by weight.

* * * * *